United States Patent
Dymetman et al.

(10) Patent No.: US 8,972,244 B2
(45) Date of Patent: Mar. 3, 2015

(54) SAMPLING AND OPTIMIZATION IN PHRASE-BASED MACHINE TRANSLATION USING AN ENRICHED LANGUAGE MODEL REPRESENTATION

(71) Applicant: Xerox Corporation, Norwalk, CT (US)

(72) Inventors: Marc Dymetman, Grenoble (FR); Wilker Ferreira Aziz, Sao Paulo (BR); Sriram Venkatapathy, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 234 days.

(21) Appl. No.: 13/750,338

(22) Filed: Jan. 25, 2013

(65) Prior Publication Data

US 2014/0214397 A1    Jul. 31, 2014

(51) Int. Cl.
G06F 17/27   (2006.01)
G06F 17/20   (2006.01)
G06F 17/28   (2006.01)
G10L 15/00   (2013.01)

(52) U.S. Cl.
CPC ............ *G06F 17/28* (2013.01); *G06F 17/2818* (2013.01)
USPC ......................... 704/9; 704/1; 704/2; 704/255

(58) Field of Classification Search
CPC . G06F 17/2818; G06F 17/2775; G06F 17/11; G06F 17/28; G10L 15/083; G10L 15/26
USPC .............................. 704/1, 2, 9, 255
See application file for complete search history.

(56) References Cited

U.S. PATENT DOCUMENTS

| | | | |
|---|---|---|---|
| 7,240,004 B1 * | 7/2007 | Allauzen et al. | 704/255 |
| 8,543,374 B2 * | 9/2013 | Dymetman | 704/2 |
| 2011/0022380 A1 | 1/2011 | Zaslavskiy et al. | |
| 2013/0338999 A1 | 12/2013 | Dymetman et al. | |

OTHER PUBLICATIONS

Carter, et al. "Exact sampling and decoding in high-order hidden Markov Models", Proc. of the 2012 Joint Conf. on Empirical Methods in Nat. Lang. Processing and Comp. Nat. Lang. Learning, Jul. 12-14, 2012, pp. 1125-1135.

Koehn, et al. "Moses: Open Source Toolkit for Statistical Machine Translation", Proc. of the ACL 2007 Demo and Poster Sessions, Jun. 2007, pp. 177-180.

Lopez, et al. "A Survey and Statistical Machine Translation", Computational Linguistics and Information Processing Laboratory, Apr. 2007, pp. 1-29.

* cited by examiner

*Primary Examiner* — Charlotte M Baker
(74) *Attorney, Agent, or Firm* — Fay Sharpe LLP

(57) ABSTRACT

Rejection sampling is performed to acquire at least one target language translation for a source language string s in accordance with a phrase-based statistical translation model $p(x)=p(t, a|s)$ where t is a candidate translation, a is a candidate alignment comprising a biphrase sequence generating the candidate translation t, and x is a sequence representing the candidate alignment a. The rejection sampling uses a proposal distribution comprising a weighted finite state automaton (WFSA) $q^{(n)}$ that is refined responsive to rejection of a sample $x^*$ obtained in a current iteration of the rejection sampling to generate a refined WFSA $q^{(n+1)}$ for use in a next iteration of the rejection sampling. The refined WFSA $q^{(n+1)}$ is selected to satisfy the criteria $p(x) \leq q^{(n+1)}(x) \leq q^{(n)}(x)$ for all $x \in X$ and $q^{(n+1)}(x^*) < q^{(n)}(x^*)$ where the space X is the set of sequences x corresponding to candidate alignments a that generate candidate translations t for the source language string s.

20 Claims, 7 Drawing Sheets

SAMPLING AND OPTIMIZATION IN PHRASE-BASED MACHINE TRANSLATION USING AN ENRICHED LANGUAGE MODEL REPRESENTATION

BACKGROUND

The following relates to the machine translation arts, statistical machine translation (SMT) arts, and related arts.

Phrase-based statistical machine translation (SMT) systems employ a database of relatively short source language-target language bi-phrases. The SMT system translates a source language text by identifying bi-phrases that include words or phrases of the source language text and optimizing the selection and arrangement of the bi-phrases to generate the translation target language text. The optimization is respective to various quality metrics, usually called features. Commonly, these features include local features calculated for individual bi-phrases and alignment features that characterize the arrangement of bi-phrases. An example of a local feature is a frequency metric indicating how often the bi-phrase occurred in a training corpus of source language-target language documents. In general, the higher the frequency in the training corpus, the more probable it is that the bi-phrase is a correct selection for the SMT translation. This probability can be formulated as two conditional probabilities: the frequency of the target language text given the source language text, and vice versa.

Features characterizing the linguistic quality of the translation in the target language are typically formulated using a target language model (target LM), for example an n-gram model estimated over the target language portion of the training corpus. For n=3, as an example, the n-gram model provides a probability for a sequence of three bi-phrases based on the frequency of occurrence of the corresponding target language sequence in the corpus. Another feature typically used is a distortion feature, which is a metric of deviation of the target language translation from what would be obtained if the bi-phrases were ordered in accord with the ordering of the source language phrases in the source language text. (Colloquially, the distortion feature penalizes target language translations that have ordering of target language words strongly deviating from the ordering of the corresponding source language words).

In constructing the translation, another constraint that may be applied is a source word consumption constraint. Typically, this constraint is designed to ensure that each source language word of the text to be translated is used (i.e. consumed) exactly once in generating the target language text. This constraint is difficult to apply because there is (in general) no one-to-one correspondence between source language words and target language words. For example, in translating French into English, the bi-phrase "curieuse—quite bizarre" equates one source language word ("curieuse") to two target language words ("quite bizarre"). The opposite situation can also arise, e.g. in performing English-to-French translation this same bi-phrase translates a two source language words ("quite bizarre") to a single target language word ("curieuse").

A typical formulation for phrase-based SMT employs a log-linear model of the form:

$$p(t, a \mid s) = \frac{1}{Z_s} \exp \sum_k \lambda_k h_k(s, a, t)$$

where the $h_k$ terms are features, that is, functions of the source string s, of the target string t, and of the alignment a which is a representation of the sequence of biphrases that were used to build t from s. The order of the sequence is defined by reference to the target side, that is, a biphrase b precedes a biphrase b' in the alignment if and only if the target side of b precedes the target side of b' in the target language string t. The $\lambda_k$ terms are weights, and $Z_s$ is a normalization factor that guarantees that p(t, a|s) is a proper conditional probability distribution over the pairs (t, a).

Local features are those features that are local to biphrases (or, said another way, can be computed based only on the biphrase). Some suitable local features include forward and reverse conditional probability features log p($\tilde{t}$|$\tilde{s}$) and log p($\tilde{t}$|$\tilde{s}$), where $\tilde{s}$ is the source side of the biphrase and $\tilde{t}$ is the target side. The values of these features for a biphrase are suitably estimated on the basis of statistics for that biphrase in a large bilingual training corpus. Another possible local feature is the so-called "phrase penalty" feature, which is equal to 1 for each biphrase in the alignment. Similarly, a "word penalty" feature may be employed which counts the number of words in $\tilde{t}$.

Global features depend on the order in which biphrases appear in the alignment, and cannot be computed based on a biphrase in isolation. One such feature is the language model feature log p(t), which computes the probability of the target string t associated with the translation candidate, typically according to an n-gram language model estimated over a large target language corpus. Another possible global feature is a distortion feature, which measures how much the sequence of biphrases of the candidate translation deviate from the "monotonic" order, namely the order that would be imposed if the target sides of the biphrases were sequenced in the same order as their source-sides.

Design of a particular implementation of the log-linear model p(t, a|s) involves providing a bi-phrase database, selecting the set of features $h_k$, and training the model on a bilingual corpus to optimize the weights $\lambda_k$ and $Z_S$. A decoder then employs the trained model to find a target language translation, defined by a pair (t, a), that maximizes the conditional probability p(t, a|s) for an input source string s and outputs the corresponding target language translation. An example of a phrase-based SMT employing this approach is the Moses statistical machine translation system (available at http://www.statmt.org/moses/ last accessed Dec. 21, 2012).

Existing decoders typically employ some variant of a heuristic left-to-right search, that is, they attempt to build a candidate translation (t, a) incrementally, from left to right, extending the current partial translation at each step with a new biphrase, and computing two scores: a score for the known elements of the partial translation so far, and a heuristic estimate of the remaining cost for completing the translation. One such approach uses a form of beam-search, in which several partial candidates are maintained in parallel, and candidates for which the current estimated likelihood p(t, a|s) is too low are pruned in favor of candidates that are more promising.

These existing decoders have certain disadvantages. For example, because the search tree is pruned during the search to avoid combinatorial explosion, the solution that is found at the end of the search is typically suboptimal. Even if the solution is actually an optimal solution, there is no way to determine this. The suboptimality problem is heightened in the presence of a high-order target language model (LM), because such high-order models make it more difficult to "merge" states during the beam-search, and thus lead to larger state spaces that need to be maintained in memory. The left-to-right processing also leads to decisions taken by the decoder being dependent on a local context, and limits or prevents the use of global features computed from the whole translation candidate.

BRIEF DESCRIPTION

In some illustrative embodiments disclosed as illustrative examples herein, a non-transitory storage medium stores instructions executable by an electronic data processing device to perform rejection sampling to acquire at least one accepted target language translation for a source language string s in accordance with a phrase-based statistical translation model $p(x)=p(t, a|s)$ where t is a candidate translation, a is a candidate alignment comprising a source language-target language biphrase sequence generating the candidate translation t, and x is a sequence representing the candidate alignment a. The rejection sampling using a proposal distribution comprising a weighted finite state automaton (WFSA) $q^{(n)}$ that is refined responsive to rejection of a sample x* obtained in a current iteration of the rejection sampling to generate a refined WFSA $q^{(n+1)}$ for use in a next iteration of the rejection sampling. The refined WFSA $q^{(n+1)}$ is selected to satisfy the criteria $p(x) \leq q^{(n+1)}(x) \leq q^{(n)}(x)$ for all $x \in X$ and $q^{(n+1)}(x^*) < q^{(n)}(x^*)$ where the space X is the set of sequences x corresponding to candidate alignments a that generate candidate translations t for the source language string s.

In some illustrative embodiments disclosed as illustrative examples herein, a method is disclosed of generating at least one target language translation for a source language string s in accordance with a phrase-based statistical translation model $p(x)=p(t, a|s)$ where t is a candidate translation, a is a candidate alignment comprising a source language-target language biphrase sequence generating the candidate translation t, and x is a sequence representing the candidate alignment a. The method comprises: performing iterative rejection sampling of p(x) by generating a sample x* and accepting or rejecting the sample x* based on a comparison of p(x*) and q(x*) where q is a proposal distribution comprising a weighted finite state automaton, the at least one target language translation corresponding to an accepted sample x*; during the iterative rejection sampling, identifying a sample x* that includes a sub-sequence $a_k \ldots a_{k+l}$ violating a no overlap constraint requiring that the alignment a consumes each word of the source language string s exactly once; and refining q so that it does not accept any sequence x that contains the sub-sequence $a_k \ldots a_{k+l}$, the refined q being used in subsequent iterations of the iterative rejection sampling. The iterative rejection sampling including the identifying and refining operations is suitably performed by an electronic data processing device.

In some illustrative embodiments disclosed as illustrative examples herein, an apparatus comprises an electronic data processing device and a non-transitory storage medium storing instructions executable by the electronic data processing device to perform a method including performing rejection sampling of a phrase-based statistical translation model $p(x)=p(t, a|s)$ where t is a candidate translation, a is a candidate alignment comprising a source language-target language biphrase sequence generating the candidate translation t, and x represents the candidate alignment a as a sequence of triples. Each triple includes: a field E denoting exactly one word of the translation t, a field B denoting the biphrase generating E, and a field N denoting the count of words of the source language string s consumed by the biphrases of the alignment a up to and including the biphrase generating E. The method further includes, during the rejection sampling, identifying a sample x* as including a sub-sequence $a_k \ldots a_{k+l}$ violating a no overlap constraint requiring that the alignment a consumes each word of the source language string s exactly once based on the value of N for the last triple in the sample x* being different from the number of words in the source language string s.

DETAILED DESCRIPTION

Figure 1:
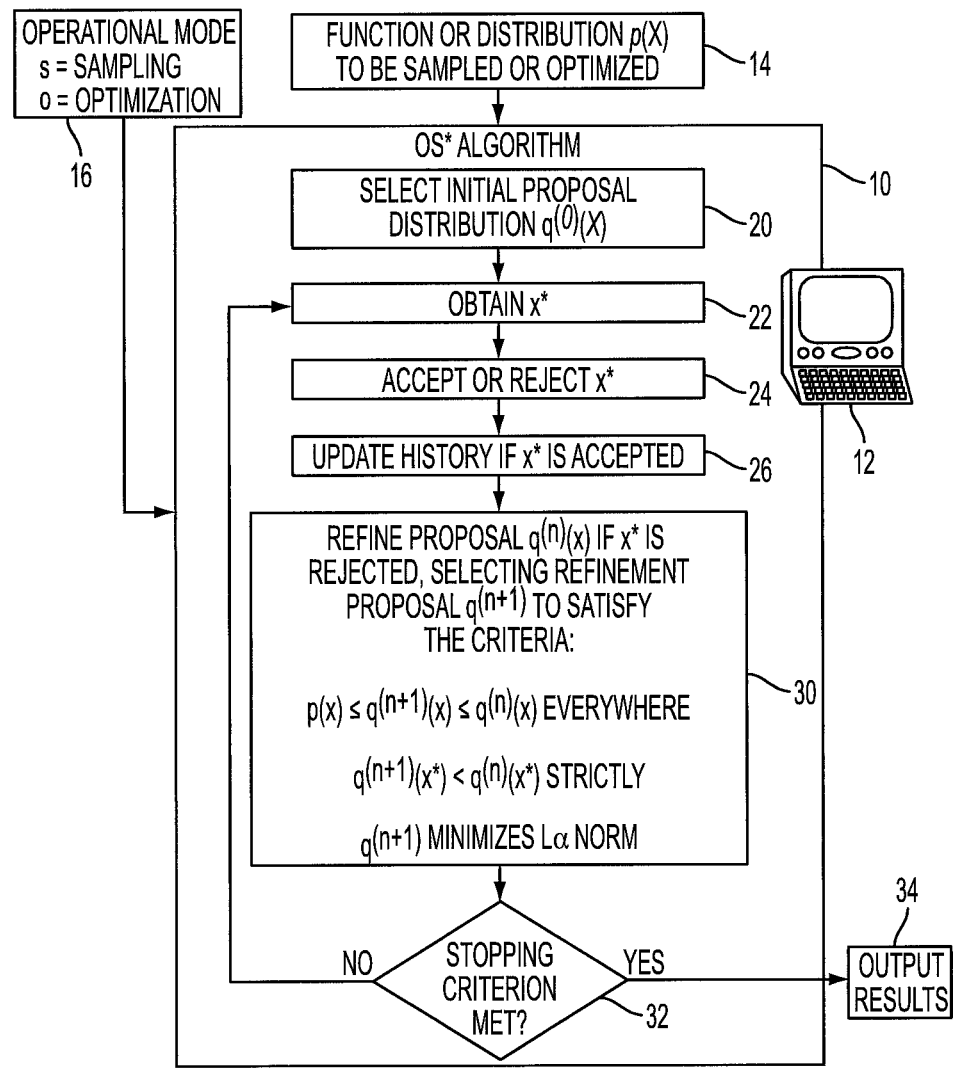
FIG. 1 diagrammatically shows an illustrative system for performing either sampling or optimization in accord with an operational mode.

Disclosed herein are improved phrase-based statistical machine translation (PB-SMT) methods and apparatuses. The approach employs a technique referred to herein as the OS* algorithm, which is a joint algorithm for performing either sampling or optimization. To perform statistical machine translation as disclosed herein, the OS* algorithm is applied to sample from the trained PB-SMT model $p(x)=p(t, a|s)$ for a given input source-language string s. (In the illustrative examples, the PB-SMT model p(t, a|s) has the log-linear form discussed in the background; however, other PB-SMT models of other forms for generating the probability p(t, a|s) are also contemplated.) For translation of a given source language sentence s, the configuration x suitably corresponds to the alignment a which specifies the sequence of biphrases that build the target language translation t from the source language string s. The OS* algorithm as applied to this PB-SMT problem entails generating a proposal distribution in the form of a weighted finite state automaton q such that $q(x) \geq p(x)$ for all configurations x corresponding to biphrase sequences, i.e. alignments, a indicated by the PB-SMT model p(t, a|s) as generating a candidate translation t for source language string s. A sample x* is drawn from the automaton q, for example randomly or by choosing x* to maximize q(x), and the sample is accepted or rejected on the basis of a ratio p(x*)/q(x*). If the sample x* is rejected, then the proposal distribution, i.e. automaton q(x), is refined based in information gleaned from the rejection of sample x* in order to make q(x) closer to p(x) while still ensuring the condition $q(x) \geq p(x)$ for all x remains satisfied. Typically, this entails reducing q(x) at x* and (for more efficient convergence) preferably in some region around x*. By iterating this process, the proposal distribution q(x) becomes progressively closer to p(x) and consequently the statistical probability of acceptance of a given sample x* based on ratio p(x*)/q(x*), increases. In sampling, the process suitably terminates when the acceptance rate exceeds a threshold, while in optimization termination is suitably when $$1 - \frac{p(x^*)}{q(x^*)} < \varepsilon$$

where ϵ is a tolerance threshold.

The disclosed SMT decoding approach has a number of advantages over existing decoders that employ a heuristic left-to-right search. The OS* based decoder can produce an exact (i.e. true) optimal translation relative to the underlying model p(t, a|s), and it is possible to verify that the generated solution is indeed the optimal solution. Furthermore, because the OS* based decoder performs sampling over the automaton q which holistically represents the entire translation, it naturally utilizes all features $h_k$ of the model p(t, a|s), including the global features. Still further, the OS* based SMT decoder can be configured to perform decoding in the usual sense (i.e. the optimization problem of finding the most highly-scored candidate translation relative to the underlying model), but can also (or alternatively) perform exact sampling from this model. Applications for this added dimension of SMT sampling are numerous, ranging from the ability to detect and exploit several modes of the underlying conditional distribution of translation candidates, to the application of Minimum Bayes Risk (MBR) decoding to the samples of translation produced. This latter technique is theoretically preferable to applying MBR to an "$n_{best}$" list around a single mode). Further applications of SMT sampling include learning Bayesian probabilistic models without recourse to approximate Markov Chain Monte Carlo (MCMC) sampling techniques such as Gibbs or Metropolis-Hastings.

The OS* algorithm is first described in general (that is, without specific reference to the application of phrase-based statistical machine translation).

With reference to FIG. 1, a joint algorithm for performing either sampling or optimization, referred to herein as the OS* algorithm 10, is described. The OS* algorithm 10 is suitably implemented by a computer or other electronic data processing device 12 that includes a processor (e.g., microprocessor, optionally multi-core) and data storage and that executes instructions to perform the OS* algorithm 10. The instructions that are executed by the computer or other electronic data processing device 12 to perform the OS* algorithm are suitably stored on a non-transitory storage medium (not shown) such as a hard disk or other magnetic storage medium, random access memory (RAM), read-only memory (ROM), or another electronic storage medium, an optical disk or other optical storage medium, a combination of the foregoing, or so forth.

Figure 2:
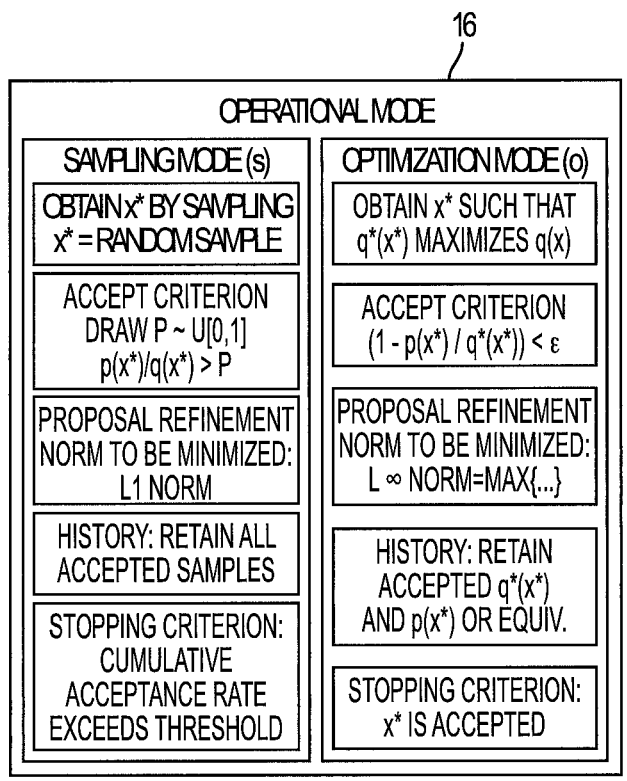
FIG. 2 diagrammatically shows settings controlled by the operational mode of the system of FIG. 1.

With reference to FIGS. 1 and 2, the OS* algorithm operates to sample or optimize a function or distribution 14, denoted herein as the function or distribution p which is defined over a space X which may be a one-dimensional space or a multi-dimensional space. Whether the OS* algorithm 10 performs sampling or optimization is controlled by an operational mode 16 which can be set to either sampling (s) or optimization (o). FIG. 2 presents the differences between the sampling and optimization modes.

The OS* algorithm 10 performs rejection sampling. To initiate, an initial proposal distribution 20 is selected. The initial proposal distribution is denoted $q^{(0)}(x)$ and is defined for samples x∈X. In an operation 22, a sample x* is obtained. In the case of sampling mode, the sample x* is obtained by random sampling. In the case of optimization mode, the sample x* is chosen to maximize $q^{(0)}(x)$ (for the first iteration), or more generally to maximize $q^{(n)}(x)$ (for iteration (n)). In an operation 24, the sample x* is accepted or rejected. The choice of acceptance criteria depends upon whether the OS* system 10 is operating in sampling mode or optimization mode. In the case of sampling mode, a suitable selection criterion is based on comparison of ratio p(x*)/q(x*) with a random draw. (Here, the shorthand notation q=$q^{(n)}$ denotes the proposal distribution for the current iteration of the rejection sampling). The random draw can, for example, be a random draw from a normalized uniform probability distribution U[0,1] that has uniform value between zero and one and for which $\int_0^1 U[0,1] \, dv=1$. In the case of optimization mode, a suitable selection criterion is based on a difference between or ratio of q* and p(x*), where the shorthand q*=q(x*) denotes the maximum value of q in the space X.

In an operation 26, if the sample x* is accepted (in operation 24) then a history is updated to include the sample x*. In sampling mode, this entails adding the sample x* to a set of accepted samples. In optimization mode, only one sample is ultimately accepted, namely the first sample encountered for which the difference between or ratio of q* and p(x*) satisfies a maximum threshold ϵ, i.e. (q*−p(x*))<ϵ. (As will be further explained herein, that maximum threshold ϵ will define an error metric for the optimized value of p).

On the other hand, in an operation 30, if the sample x* is rejected (in operation 24) then the proposal distribution $q^{(n)}$ is refined to generate a refined proposal distribution $q^{(n+1)}$ for use in a next iteration of the rejection sampling. The refined proposal distribution $q^{(n+1)}$ is selected to satisfy the following criteria: $p(x) \leq q^{(n+1)}(x) \leq q^{(n)}(x)$ (where the first inequality ensures that $q^{(n+1)}$ is an upper bound on p(x) and the second inequality ensures that the refined proposal distribution $q^{(n+1)}$ is no worse than $q^{(n)}$ for any point in the space X); $q^{(n+1)}(x^*) < q^{(n)}(x^*)$ (which ensures that the refined proposal distribution $q^{(n+1)}$ is better than $q^{(n)}$ at the rejected sample x*); and a norm $\|q^{(n+1)}\|_\alpha$ is minimized. The value of α in this third criterion depends on the operational mode. For sampling, α<∞ and more preferably α=1. In this case, choosing $q^{(n+1)}$ to minimize the L1 norm $\|q^{(n+1)}\|_1$ ensures that the chosen $q^{(n+1)}$ lowers the overall refined proposal distribution $q^{(n+1)}$ as much as possible. For sampling, α=∞, which takes advantage of the equivalency $\|q^{(n+1)}\|_\infty = \max\{q^{(n+1)}\}$. Thus, minimizing $\|q^{(n+1)}\|_\infty$ ensures that the chosen $q^{(n+1)}$ lowers the maximum value of the refined proposal distribution $q^{(n+1)}$ as much as possible.

The operations 22, 24 and operation 26 (for acceptance) or operation 30 (for rejection) form one iteration of the rejection sampling. In a decision 32, it is determined whether the stopping criterion is met. In the case of sampling, a plurality of accepted samples are to be determined in accord with the distribution p(x) (in its normalized form, i.e. $\bar{p}(x)$), and a suitable stopping criterion is when the cumulative acceptance rate of the rejection sampling exceeds a threshold. In the case of optimization, a single maximum value for the distribution p(x) is to be determined, and so a suitable stopping criterion is when the first sample x* is accepted. If the stopping criterion is not met, processing flows back to the operation 22 to obtain the next sample x* which is processed using the refined proposal distribution $q^{(n+1)}$, and so forth. When the stopping criterion is met at decision 32, the results are output in operation 34. In the case of sampling, the output suitably includes the set of accepted samples. The sampling results optionally additionally or alternatively include the last refinement of the proposal distribution q, which can subsequently be used to produce further exact samples from the target distribution p(x). In the case of optimization, the output is the (single) accepted sample corresponding to the maximum value of the distribution p(x). Since the true maximum value of p(x) is known to have lower bound p(x*) and upper bound q*, the maximum value can be well-approximated as q*=q(x*) or as p(x*) or as some intermediate value, e.g. (q*+p(x*))/2. Optionally, the operation 34 in the case of optimization also outputs an error metric computed based on the values p(x*) and q*=q(x*) for the accepted sample distribution x*. For example, the optimization output can be (q*+p(x*))/2±(q*−p(x*))/2 or, in slightly less aggressive form, can be (q*+p(x*))/2±ϵ/2, the latter following since (q*−p(x*))≤ϵ is the acceptance/stopping criterion for optimization.

FIG. 2 summarizes the differences between the sampling mode and optimization mode. These differences include: how the sample x* is obtained in the operation 22 (by random sampling or, for optimization, by identifying x*=argmax$_x$ {q(x)}); the acceptance criterion for accepting the sample x*; the norm used in the proposal distribution refinement; the history (retain a set of accepted samples in the case of sampling, or only the first accepted sample in the case of optimization); and the stopping criterion (suitably based on cumulative acceptance rate for sampling, or stop after the first sample is accepted in the case of optimization). Advantageously, the same OS* algorithm 10 can perform either sampling or optimization in accord with the chosen operational mode 16.

Further disclosure including some conceptual bases for the OS* algorithm are set forth in the following.

Suppose that μ is a base measure on a space X and that p is a $L_1$ nonnegative function on (X, μ), i.e. $\int_X p(x) d\mu(x) < \infty$, and let us define $\bar{p}(x) \equiv$ $$\frac{p(x)}{\int_X p(x) d\mu(x)}.$$

The function p can then be seen as an unnormalized density over X, and $\bar{p}$ as a normalized density which defines a probability distribution over X, referred to herein as the target distribution, which is the distribution we are interested to sample from (by abuse of language, we will also say that a sample from $\bar{p}$ is a sample from p). While it may or may not be possible to sample directly from the target distribution, it is assumed that it is possible to compute p(x) for any given x. Rejection Sampling (RS) then works as follows. A certain unnormalized proposal density q is defined over X, which is such that (i) it is known how to directly sample from it (more precisely, from $\bar{q}$), and (ii) for all x∈X, p(x)≤q(x). This latter condition states that q(x) is an upper bound on p(x). The following iterative process is then performed: (1) a sample x is drawn from q, (2) the ratio r(x)≡p(x)/q(x)≤1 is computed, (3) the sample x is accepted with probability r(x), otherwise sample x is rejected, (4) repeat steps (1)-(3) iteratively. It can then be shown that this procedure produces an exact sample from p. The average rate at which the RS produces accepted samples, that is, the acceptance rate, is equal to P(X)/Q(X), where for a (measurable) subset A of X, the parameter P(A)≡$\int_A$ p(x)dμ(x) is defined (and similarly with Q). Put another way, the acceptance rate is that equal to the ratio of the surface below the p curve with that below the q curve.

To maximize the acceptance rate, the q curve should be made as low as practicable while keeping it above the p curve. Toward this end, Adaptive Rejection Sampling (ARS) techniques have been developed. See Gilks et al., "Adaptive rejection sampling for Gibbs sampling", Applied Statistics pages 337-348 (1992); Görür et al., "Concave convex adaptive rejection sampling", Techical Report, Gatsby Computational Neuroscience Unit, 2008. In ARS, at certain stages of the process the q curve is updated to a lower curve q' with a better acceptance rate. These techniques have predominantly been applied to the case where X is the one-dimensional real line and where p is a concave, log-concave or piecewise log-concave curve, in which case it is possible to exploit convexity properties to progressively better and better approximate p by an upper bound consisting of a piecewise linear envelope.

In the OS* algorithm described with reference to FIG. 1, adaptive rejection sampling is applied in which the refinement proposal distribution q is selected to satisfy the criteria p(x)≤$q^{(n+1)}$(x)≤$q^{(n)}$(x) and $q^{(n+1)}$(x*)<$q^{(n)}$(x*) and minimization of a norm $\|q^{(n+1)}\|_\alpha$. Moreover, it is disclosed that the OS* algorithm can be used for either sampling or optimization with suitable configuration as disclosed herein (e.g., see FIG. 2). For convenience, when OS* is applied in sampling mode it is referred to as OS*$_s$, while when OS* is applied in optimization mode it is referred to as OS*$_o$. It should be noted that while the general OS* algorithm can be used in either sampling mode or optimization mode, a given implementation of the OS* algorithm may be configured to perform only sampling (for example, by hard-coding the sampling mode settings shown in FIG. 2), or a given implementation of the OS* algorithm may be configured to perform only optimization (for example, by hard-coding the optimization mode settings shown in FIG. 2).

Figure 3:
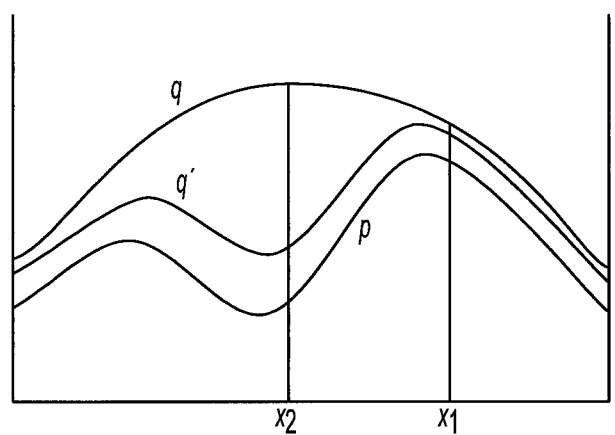
FIG. 3 diagrammatically show operation of the OS* algorithm disclosed herein operating in sampling mode.

With reference to FIG. 3, operation of the OS* algorithm in sampling mode (that is, OS*$_s$ operation) is described. The sampling starts with an initial proposal density q. The first sample is sample $x_1$, for which the ratio $r_q(x_1)$=p($x_1$)/q($x_1$) is close to 1; this leads, say, to the acceptance of sample $x_1$. The next iteration produces sample $x_2$, for which the ratio $r_q(x_2)$=p($x_2$)/q($x_2$) is much lower than 1, leading, say, to a rejection. Nonetheless, the rejection yields some useful information, namely that p($x_2$) is much lower than q($x_2$), and that evidence is used to define a new proposal distribution q' which has the following properties: p(x)≤q'(x)≤q(x) everywhere on X; and q'($x_2$)<q($x_2$) at the sample $x_2$. One extreme way of obtaining such a q' is to set q'($x_2$)=p($x_2$) and to maintain q'(x)=q(x) everywhere other than $x_2$. If the space X is discrete, then this choice of q' has the effect of improving the acceptance rate, but only slightly so, by insuring that any time q' happens to select $x_2$, it will accept it. If the space X is continuous, then this choice of q' is essentially of no improvement at all, since q'=q almost everywhere.

A better generic way to find a q' is the following. Suppose that a finite set of "one-step refinement actions" $a_j$ are available, depending on q and $x_2$, which are able to move from q to a new $q_j$=$a_j$(q, $x_2$) such that for any such $a_j$ one has p(x)≤$q_j$(x)≤q(x) everywhere on X and also $q_j$($x_2$)<q($x_2$). Then from among these available refinement actions the "best" refinement $a_j$ is chosen. For sampling, this "best" refinement is suitably the one that is such that the $L_1$ norm of $q_j$ is minimal among the possible j's, or in other words, such that $\int_X q_j(x) d\mu(x)$ is minimal in j. With this selection, the acceptance rate of $q'_j$ (which depends directly on $\|q'_j\|_1$) is improved as much as possible, while (i) not having to explore a too large space of possible refinements (assuming that the set $\{a_j\}$ is reasonably small), and (ii) moving from a representation for q to an only slightly more complex representation for $q'_j$, rather to a much more complex representation for a q' that could result from exploring a larger space of possible refinements for q.

Said otherwise, in the OS*$_s$ operation of FIG. 3, After a rejection at $x_2$, the proposal distribution q is refined to q' in such a way that q'($x_2$) is strictly below q($x_2$). This could be done by taking a "narrow dip" at $x_2$, with q'($x_2$)=p($x_2$) and keeping q' equal to q elsewhere, but it is more efficient—in terms of decreasing the surface between q and p—to take a less narrow dip, as shown in FIG. 3. The refinement q' is then chosen to maximize the surface decrease among a small list of possible one-step refinements of q.

Figure 4:
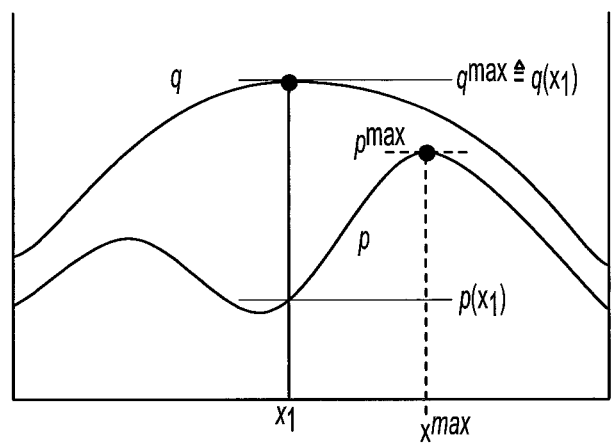
FIGS. 4 and 5 diagrammatically show operation of the OS* algorithm disclosed herein operating in optimization mode.
Figure 5:
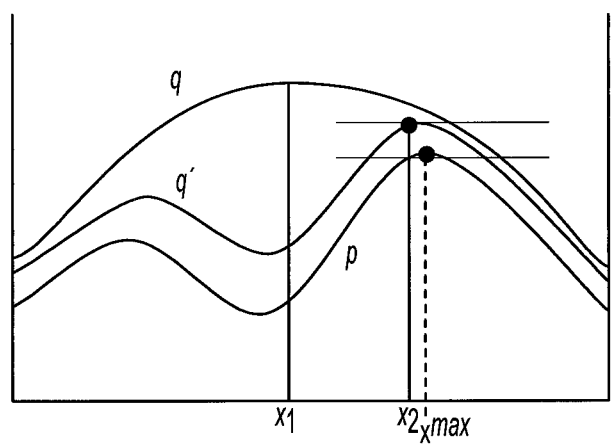

With reference to FIGS. 4 and 5, operation of the OS* algorithm in optimization mode (that is, OS*$_o$ operation) is described. FIG. 4 shows the function p to be optimized (namely maximized in this example). The (unknown) maximum $p^{max}$ is indicated in FIG. 4 by a black circle on the p curve, and corresponds to $x^{max}$ in X. FIG. 4 also shows a proposal function q which is such—analogously to the sampling case—that the following criteria are met: (1) the function q is above p on the whole of the space X and (2) it is possible to directly find the point $x_1$ in X at which q reaches its maximum $q^{max}$, shown as a black circle on the q curve.

The following observation is made. Suppose that the distance between q($x_1$) and p($x_1$) is smaller than $\epsilon$. Then it follows that the distance between q($x_1$) and $p^{max}$ is also smaller than $\epsilon$. This can be seen graphically in FIG. 4, and is due to the fact that on the one hand $p^{max}$ is higher than p($x_1$) (or, at most, p($x_1$)=$p^{max}$ in the case where $x_1$=$x^{max}$ precisely), and that on the other hand $p^{max}$ is below q($x^{max}$), and a fortiori below q($x_1$). In other words, if the maximum $q^{max}$ for the proposal function q is at a coordinate $x_1$ and q($x_1$)−p($x_1$)<$\epsilon$, then we can conclude that we have found the maximum of p up to an error metric $\epsilon$.

In the case of $x_1$ in FIG. 4, the difference q($x_1$)−p($x_1$) is relatively large, and so the sample $x_1$ is rejected in operation 24 (see FIG. 1) and the proposal distribution q is refined into q' (operation 30 of FIG. 1) using the same approach as in the sampling case, but with one difference: the one-step refinement option $a_j$ that is selected is now chosen to minimize the $L_\infty$ norm, which is equivalent to the maximum value, i.e. $\|q'\|_\infty$=max{q'(x)}. In other words, the minimization of the $L_1$ norm of q in the case of sampling is replaced by minimization of the $L_\infty$ norm. With reference to FIG. 5, once this q' has been selected, one can then find its maximum at $x_2$ and then the process can be repeated with $q^{(1)}$=q,$q^{(2)}$=q', . . . until the difference between $q^{(k)}$($x_k$) and p($x_k$) is smaller than a certain predefined threshold, e.g. error metric $\epsilon$.

To summarize the optimization (OS*$_o$) operation, when $x^{max}$ is the location in X of the maximum $p^{max}$ of p, and $x_1$ is the location in X of the maximum $q^{max}$ of q, then the (unknown) distance |q($x_1$)−$p^{max}$| is smaller or equal to the "gap" |q($x_1$)−p($x_1$)|, which is a known quantity. It can also be stated that the (also unknown) distance |$p^{max}$−p($x_1$)| is smaller or equal to the known gap |q($x_1$)−p($x_1$)|. So, one can say that the maximum of p is $q^{max}$ with an error metric |q($x_1$)−p($x_1$)|. Alternatively, one can say that the maximum of p is p($x_1$) with the error metric |q($x_1$)−p($x_1$)|. By splitting the difference, one can also say that maximum of p is ($q^{max}$+p($x_1$))/2±|q($x_1$)−p($x_1$)|/2. If the error is unacceptably large, then the sample $x_1$ is rejected, a refinement proposal q' is generated, and its maximum $x_2$ is computed. If the gap |q($x_2$)−p($x_2$)| is small enough, the point $x_2$ is accepted, otherwise the process continues to iterate.

While sampling and optimization are usually seen as two different and distinct tasks, as disclosed herein they can actually be viewed as two extremities of a continuous range, when considered in the context of $L_p$ spaces. Roughly speaking, if (X, µ) is a measure space, and if $f$ is a real-valued function on this space, one defines the $L_p$ norm $\|f\|_p$, for 1≤p<∞ as:

$$\|f\|_p = (\int_X |f|^p(x) d\mu(x))^{1/p} \quad (1)$$

with the $L_\infty$ norm $\|f\|_\infty$ defined as:

$$\|f\|_\infty \equiv \inf\{C \geq 0 : |f(x)| \leq C \text{ for almost every } x\} \quad (2)$$

where the right term is called the essential supremum of |$f$|, and can be thought of roughly as the "max" of the function. So, with some abuse of language, one can write:

$$\|f\|_\infty \equiv \max_{x \in X} |f|. \quad (3)$$

The space $L_p$, for 1≤p≤∞, is then defined as being the space of all functions $f$ for which |$f$|$_p$<∞. Under the condition that $\|f\|_p$<∞ for some p<∞, it follows that:

$$\lim_{p \to \infty} \|f\|_p = \|f\|_\infty. \quad (4)$$

In the following, the notation $L_\alpha$ is used to indicate the norm, rather than the more conventional notation of norm $L_p$, in order to avoid confusion between the norm index subscript and the target distribution p on which sampling or optimization is performed.

The standard notion of rejection sampling is obtained by performing the OS* algorithm of FIG. 1 using the $L_1$ norm (i.e., α=1 for sampling). However the following generalization is introduced herein: We will say that we are performing sampling of a non-negative function f relative to $L_\alpha$(X, µ), for 1≤α<∞, if f∈$L_\alpha$(X, µ) and if we sample—in the standard sense—according to the normalized density distribution $$\bar{f}(x) \equiv \frac{f(x)^p}{\int_X f(x)^p d\mu(x)}.$$

In the case α=∞, we will say that we are sampling relative $L_\infty$(X, µ), if f∈$L_\infty$(X, µ) and if we perform optimization relative to $f$, more precisely, if for any $\epsilon$>0, we are able to find an x such that |$\|f\|_\infty$−$f$(x)|<$\epsilon$.

The general design for performing the OS* algorithm of FIG. 1 can be described as follows. The goal is to OS-sample from p, where "OS-sample" refers to a generalized sense that covers both sampling and optimization. We have at our disposal a family $Q$ of proposal densities over the space (X, µ), such that, for every q∈$Q$, we are able to OS-sample efficiently from q. Upon rejection of a sample $x_1$ relative to a proposal q, with p($x_1$)<q($x_1$), we have at our disposal a (limited) number of possible "one-step" refinement options q', with p≤q'≤q and such that q'($x_1$)<q($x_1$). We then select one such q'. A suitable selection criterion is to prefer the q' which has the smallest $L_1$ norm (sampling case) or the smallest $L_\infty$ norm (optimization). Other criteria can be used, such as selecting the q' that minimizes q'($x_1$). The OS* algorithm iterates until a suitable stopping criterion is met. In the case of sampling, one suitable stopping criterion is when the cumulative acceptance rate is above a certain threshold. In the case of optimization, the iterating suitably stops when the ratio p($x_1$)/q($x_1$) is closer to 1 than a certain threshold, with $x_1$ being the maximum for q. The threshold then provides an error metric (i.e., maximum error) for the determined maximum of the target distribution p.

The following Algorithm 1 presents pseudo-code for performing the OS* algorithm selectably for either sampling or optimization:

---
Algorithm 1 The OS* algorithm
---
1: while not Stop(h) do
2:   OS-Sample x ~ q
3:   r ← p(x)/q(x)
4:   Accept-or-Reject(x,r)
5:   Update(h,x)
6:   if Rejected(x) then
7:     q ← Refine(q,x)
8: return q along with accepted x's in h
---

Algorithm 1 parallels the OS* algorithm shown in FIG. 1. The OS-Sample subroutine corresponds to operation 22, the subroutine Accept-or-Reject corresponds to operation 24, The Update subroutine corresponds to operation 26, the Refine subroutine corresponds to operation 30, and the Stop subroutine corresponds to decision operation 32.

On entry into Algorithm 1, we assume that we are either in sample mode or in optimize mode, and also that we are starting from a proposal q which (1) dominates p and (2) from which we can sample or optimize directly. We use the terminology OS-Sample to represent either one of these cases, where OS-Sample x: q refers to sampling an x according to the proposal q or optimizing x on q (namely finding an x which is an argmax of q), according to the situation. On Algorithm 1 line (1), h refers to the history of the sampling so far, namely to the set of attempts that have been done so far, each being marked for acceptance or rejection (in the case of sampling, this is the usual notion, in the case of optimization, all but the last proposal will be marked as rejections). (In the OS* algorithm of FIG. 1, corresponding operation 26 is modified slightly versus Algorithm 1 in that operation 26 is performed only upon acceptance so that rejections are not recorded in the history. Alternatively, operation 26 can record both acceptances and rejections, which can be useful in calculating acceptance rate, although this rate can also be calculated by tracking the count of acceptances and the total number of iterations.). The stopping criterion Stop(h) is suitably as follows. In sampling mode, if the number of acceptances so far relative to the number of attempts is larger than a certain predefined threshold, and in this case will return on line (8), first, the list of accepted x's so far, which is already a valid sample from p, and second, the last refinement q, which can then be used to produce any number of future samples as desired with an acceptance ratio similar to the one observed so far. In optimization mode, if the last element x of the history is an accept, and in this case will return on line (8), first the value x, which in this mode is the only accepted attempt in the history, and second, the information on the maximum, e.g. p(x) and q(x) for the accepted x from which one can compute the maximum value and its error.

On Algorithm 1 line (3), the ratio r is computed, and then on line (4) we decide to accept x or not based on this ratio; in optimization mode, we accept x if the ratio is close enough to 1, as determined by a threshold; in sampling mode, we accept x based on a Bernoulli trial of probability r. On line (5), the history is updated by recording the trial x and whether it was accepted or not (or, alternatively, line (5) can be performed only for accepted samples). If x was rejected (Algorithm 1 line (6)), then on line (7), a refinement of q is performed.

Having described the joint sampling/optimization OS* algorithm generally, its disclosed application to phrase-based statistical machine translation (PB-SMT) is described.

In illustrative examples herein, the source language is French and the target language is English; however, the source and target languages can be substantially any two different natural languages. Each phrase includes one or more words (or tokens) in a specified order, with each word represented (typically in electronic form for processing by the computer or other electronic data processing device 12) by a string of alphabetic characters (in a language such as English) or by another suitable representation such as an ideogram (e.g. in a language such as Chinese), or by some combination thereof. The illustrative PB-SMT systems are also contemplated to be adapted for use in translating natural language represented in other ways, such as recorded spoken language where a phrase is represented by one or more sound snippets corresponding to spoken words. The source language input s is referred to herein variously as a source language string s or a source language sentence s, and similarly for the target language string or sentence t. The use of the term "sentence" here is in deference to typical decoding processing often being applied on a per-grammatical sentence basis; however, sentence s may include two or more grammatical sentences processed as a unit, or may include less than a complete grammatical sentence; and similarly for t.

For illustration, French-to-English translation of the source language French sentence:

cette traduction automatique est curieuse is considered. The database of English-French bi-phrases shown in Table 1 is considered. (Typically that bi-phrases database will be much larger than the simple illustrative database of Table 1, including thousands, tens of thousands, or more bi-phrases).

TABLE 1

Illustrative Bi-phrases Database

| Bi-phrase identifier | Source (French) phrase | Target (English) phrase |
|---|---|---|
| h | cette | this |
| t | traduction | translation |
| ht | cette traduction | this translation |
| mt | traduction automatique | machine translation |
| a | automatique | automatic |
| m | automatique | machine |
| i | est | is |
| s | curieuse | strange |
| q | curieuse | quite bizarre |

A PB-SMT model constructed for such a database may produce various translation candidates with various probabilities. One possible translation is:

this machine translation is strange which is obtained through taking the following sequence of decisions, each decision being represented by a biphrase:

h. mt. i. s;

Here the translation starts with the bi-phrase h, which consumes the source language (French) word cette and outputs the target language (English) word this; followed by the bi-phrase mt which consumes the French words traduction automatique and outputs the English words machine translation, and so forth, until all source language words of the input source language sentence are consumed without repetition.

Another translation candidate may be:

this translation quite bizarre is automatic which corresponds to the following sequence of decisions:

ht. q. i. a where again, all the source language words are consumed without repetition. Notice that here the source words are being consumed in a different order than the order they have in the source language sentence, which is legal.

Conventionally, a bi-phrase is represented by a pair B=(s̃, t̃) where s̃ and t̃ are the source language and target language phrases, respectively. The bi-phrase representation (s̃, t̃) does not, however, convey any information about the consumption of source language words.

In applying the OS* algorithm to perform PB-SMT decoding, it will be convenient to employ a "per-word" triple format (E, B, N) to represent the candidate alignment a, where the field E denotes is an English word (exactly one such word, more generally exactly one source language word), the field B denotes a bi-phrase producing this word, and the field N denotes the number of source language French words that have been consumed so far (or, more precisely, the cumulative number of source language tokens appearing in the biphrase B and in the biphrases before B in the sequence representing the translation candidate). Using this per-word triple notation, the first alignment h. mt. i. s corresponding to the first translation candidate (this machine translation is strange) is written as:

(this, h, 1). (machine, mt, 3). (translation, mt, 3). (is, i, 4). (strange, s, 5)

and the second alignment ht. q. i. a corresponding to the second translation candidate (this translation quite bizarre is automatic) is written as:

(this, ht, 2). (translation, ht, 2). (quite, q, 3). (bizarre, q, 3). (is, i, 4). (automatic, a, 5)

The triplet notation advantageously facilitates compliance with a no-overlap constraint employed in the illustrative examples. This constraint requires that each source language word be consumed exactly once in constructing the translation candidate. The no overlap constraint can be decomposed into two components: (1) each source language word must be consumed and (2) the total number of source language words consumed must be equal to the total number of source language words in the source language sentence being translated. In the triplet notation, component (2) is satisfied if and only if N in the last triplet equals the total number of source language words in the source language sentence. For the illustrative French example: cette traduction automatique est curieuse, this means N=5 is required for the rightmost triplet. The first component can be checked in pairwise fashion by ensuring that no two bi-phrases of the translation candidate consume the same source language word. Similarly the second example is also legal and corresponds the sequence of biphrases ht. q. i. a.

In evaluating the no overlap rule, each occurrence of a word in the source language sentence is treated as a distinct word. For example, in translating the English sentence to be or not to be into another language (so that here English is the source language), the two occurrences of the word to are treated as two distinct source language words, and similarly the two occurrences of the word be are treated as two distinct source language words.

In order to compute the evaluation or score of any such candidate translation relative to the PB-SMT model, a cost is associated to each triple in the context of previous triples, as follows. The cost can include various components. For example, forward and reverse conditional probability costs of each biphrase (including lexical costs) can be associated to the first triple in the sequence corresponding to that biphrase (a kind of "unigram" cost).

A distortion cost of a biphrase relative to the previous biphrase can be computed by looking at exactly one previous triple in the sequence (a kind of "bigram" cost). The legality of a triple relative to the previous triple in the sequence can also be represented by a "bigram" cost, namely a null cost if the latter triple can follow the former triple, an infinite cost if not. The legality can be computed based on the third value N of the triple. For example, (machine, mt, 3) may come after (this, h, 1) because 3=1+2 and the bi-phrase mt consumes two source words. The only triple that can follow (machine, mt, 3) is (translation, mt, 3) because translation is the target word following the target word machine in the biphrase mt.

A target language model cost (relative to an n-gram model) of a target English word given n−1 previous target English words can be computed on a given triple by looking at the n−1 previous triples in the sequence (a kind of "n-gram" cost). This is a further advantage of the triple notation: because there is exactly one target word per triple, computing this language model cost does not require distinguishing between bi-phrases whose target sides contain variable number of target words.

In such an "enriched" n-gram language model, the labels are all possible triples of the form (E, B, N) where the target language word E is compatible with the bi-phrase B and where the count N is smaller than the length of the source sentence. In this enriched n-gram model, evaluation of a sequence of triples can be considered as a special case of computing the value of the enriched language model on this sequence of labels.

Thus, it is desired to decode (i.e. optimize) a bigram sequence, where the source language string s is a known layer, the target language translation string t is a hidden layer, and each word $x_i$ in the target language string is associated with an observation $o_i$ equal to the triple (E, B, N) where $x_i$=E. Thus, in analogy to a hidden Markov model (HMM), each bigram $x_{i-1}x_i$ in the hidden layer contributes a factor $w_2(x_i|x_{i-1})\equiv p(x_i|x_{i-1})$. We are then trying to find a target language translation string $x=x_1, \ldots, x_n$ that maximizes:

$$p(x) \propto \prod_i w_2(x_i | x_{i-1}). \qquad (5)$$

Let us just write $p(x)\Pi_i \, w_2(x_i|x_{i-1})$; we are then trying to maximize p(x) over word strings of length n. We now introduce the following notion. For a given word $x_i$ in the vocabulary, let us define:

$$w_1(x_i) \equiv \max_{x_{i-1}} w_2(x_i | x_{i-1}), . \qquad (6)$$

where the max is over all possible words $x_{i-1}$ in the vocabulary, and which we call the "max backoff", or "optimistic backoff" of the set of bigrams whose last word is $x_i$. The application of OS*$_o$ to this setup is now as follows. We define the initial proposal $q^{(1)}$ as:

$$q^{(1)}(x) \equiv \prod_i w_1(x_i). \qquad (7)$$

We see that $q^{(1)}(x) \geq p(x)$, $\forall x$, meaning that $q^{(1)}$ dominates p over the space of strings, as required of a proposal. Note that $q^{(1)}$ does not necessarily correspond to a normalized distribution, and typically $\Sigma_x q^{(1)}(x) > 1$.

Figure 6:
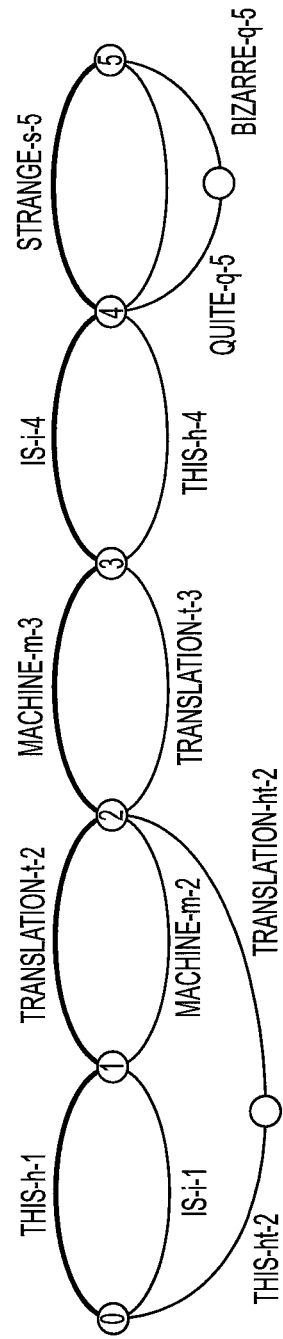
FIGS. 6 and 7 show a portion of an illustrative example of a weighted finite state automaton (WFSA) used as the proposal distribution in a phrase-based statistical machine translation (PB-SMT) system using the OS* algorithm to sample or optimize a PB-SMT model for an input source language string.

With reference to FIG. 6, it is possible to find the point $x^{(1)}$ at which $q^{(1)}$ reaches its maximum, by applying a standard Viterbi decoding technique to a weighted finite state automaton (WFSA) representing $q^{(1)}$. (Note that in FIGS. 6 and 7, the triples (E, B, N) are written as E-B-N). FIG. 6 shows an illustrative example of a weighted automaton representing the proposal $q^{(1)}$, where the weights on edges correspond to the triples. The automaton of FIG. 6 is a simple example, with only 6 states, and the usual dynamic programming techniques either for Viterbi decoding (optimization) or weight normalization into a probability distribution (sampling) are then very efficient. In FIG. 6, only the optimization case is shown, and the optimal path relative to this automaton is shown with bold edges, corresponding to the translation this translation machine is strange. In practice, the WFSA will typically include a much larger number of states and paths.

In comparing $q^{(1)}$ represented by the automaton of FIG. 6 with the probability p(t, a|s) yielded by the PB-SMT model for this path, a large gap between these values will be observed because "triple bigram" (translation, t, 2). (machine, m, 3), while legal in the sense that N is consistent, is disliked because of the fact that in the target (standard) language model for English the sequence "translation machine" is unlikely.

Figure 7:
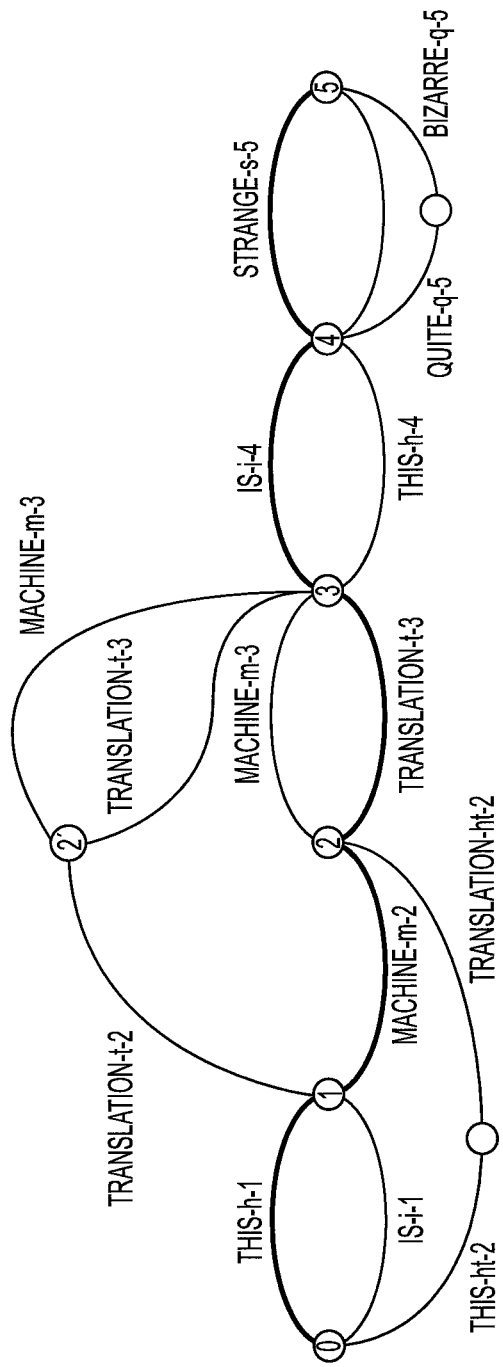

With reference to FIG. 7, based on this observation of a large difference, the sample is rejected and the proposal $q^{(1)}$ is refined into $q^{(2)}$ shown in FIG. 7, which makes explicit the context (translation, t, 2) and lowers the weight of the edge between states (2') and (3) labeled (machine, m, 3). The new maximum path for $q^{(2)}$ is again shown in bold. Note that, in FIG. 7, the maximum paths for both $q^{(1)}$ and $q^{(2)}$ do respect the no-overlap constraint. In case the maximum path for q had been (this, h, 1). (translation, t, 2). (machine, m, 3). (this, h, 4). (strange, s, 5), then there would have been an overlap over the source word cette, which would then have led to another refinement not containing this offending path.

In general, the process iterates comparing the true weight $p(x^{(k)})$ to its proposal weight $q^{(k)}$ at iteration k. If the difference is above a threshold, another refinement is performed and the iteration continues. This can be done by identifying among the target language words making up $x^{(k)}$ which one, if its context was extended by one word to form $x^{(k+1)}$, would correspond to the largest decrease in the value of $q^{(k+1)}(x^{(k+1)})$. This can be done by adding one more state to the automaton, copying some edge, and decreasing the weight of one of the edges.

The procedure just outlined for a bigram PB-SMT can be directly extended to any n-gram PB-SMT. For instance, if p(t, a|s) employs a 5-gram model, then we can introduce recursively the following max backoffs:

$$w_5(x_5 | x_1 x_2 x_3 x_4) \equiv p_5(x_5 | x_1 x_2 x_3 x_4) \quad (8)$$

$$w_4(x_5 | x_2 x_3 x_4) \equiv \max_{x_1} w_5(x_5 | x_1 x_2 x_3 x_4)$$

$$w_3(x_5 | x_3 x_4) \equiv \max_{x_2} w_4(x_5 | x_2 x_3 x_4)$$

$$w_2(x_5 | x_4) \equiv \max_{x_3} w_4(x_5 | x_3 x_4)$$

$$w_1(x_5) \equiv \max_{x_4} w_4(x_5 | x_4).$$

In this general case, when refining the current best path in the automaton $q^{(k)}$, a choice may be available between expanding on this path, say, the context of an existing unigram, bigram, trigram or even of an existing quadrigram, and the choice is made to expand the one which results in the largest "disappointment".

The refinement process stops when the ratio $p(x^{(k)})/q^{(k)}(x^{(k)})$ is closer to 1 than an arbitrary threshold, or even, optionally, when $p(x^{(k)})/q^{(k)}(x^{(k)})=1$, which will be reached at a certain point because we cannot introduce in the automaton more states than there are in the true WFSA corresponding to p(t, a|s).

The sampling algorithm is analogous to the optimization version. In the optimization case, it is possible to find the maximum path in the $q^{(k)}$ automaton, via a dynamic programming procedure for example. In substance, starting from the final state, this procedure computes, for each state, the maximum weight of a path connecting this state to the final state, and iterates this procedure for states farther and farther from the end state. The main difference in sampling is that, instead of finding the maximum path from a given state to the final state, the sum is computed of the weights of all the paths connecting this state to the final state, and the procedure iterates similarly to the optimization case. Formally, the sampling operates in the sum-product semiring while in the optimization operates in the max-product semiring (of which the log version is called the tropical semiring), but otherwise, the procedures are the same. Once these sums have been computed on all the states of the $q^{(k)}$ automaton, they can be used directly to sample from the automaton, by moving forward in the standard way. The refinements are then performed on rejects from the rejection sampler with $q^{(k)}$, up to the time the acceptance rate becomes acceptable, i.e. above a certain reasonable threshold. If x is the rejected candidate translation string, one selects, as in the optimization case, one of the n-grams for contextual refinement. While a possibility is to select this n-gram based on how much this choice decreases the value of $q^{(k+1)}(x)$ relative to $q^{(k)}(x)$, another possibility is to select it based on how much the choice decreases the overall mass of $q^{(k+1)}(x)$ relative to that of $q^{(k)}(x)$, which is in line with the $L_1$ objective that is most relevant for sampling. Once we have found a $q^{(k)}$ for which the observed acceptance rate (or more precisely, the cumulative observed acceptance rate for all the attempts done until this point, with all the refined automata up to the current $q^{(k)}$) is above a threshold, we stop the refinements, and use this final automaton for sampling an arbitrary number of times.

However, the foregoing procedure does not check the validity of the sequence relative to the no overlap condition, which requires that each source word be consumed exactly once. An example of a candidate translation string that does not respect this condition is the following:

(this, h, 1). (machine, mt, 3). (translation, mt, 3). (is, i, 4). (automatic, a, 5)

One aspect of the no overlap condition can be incorporated in the enriched n-gram model directly, namely the one that controls the evolution of the N count, which can be accounted by a "bigram" cost when moving from one element of the sequence to the other. This cost is taken to be null if the transition between a biphrase B and the next biphrase B' corresponds to incrementing N by the number of source tokens in B', and is taken to be infinite otherwise (or, in multiplicative parlance, to correspond to 1 and 0 weights respectively). But a second aspect is more difficult to control, namely the requirement that no source word be consumed twice. It is easy to check that, taken together, the two aspects ensure that each source word is consumed exactly once; the just given example violating the no overlap condition respects the first aspect, but not the second, because the source word automatique is consumed twice: once by the biphrase mt and then again by the biphrase a.

A suitable way to handle the second aspect is as follows. The value p(x) is adjusted (in the multiplicative domain) to be equal to 0 if the candidate translation sequence does not respect the no overlap constraint (or more particularly the second aspect requiring that no source word be consumed twice); otherwise p(x) has its usual value computed by the enriched n-gram model that have just described. Now, a rejection can be caused either because p(x) as computed using the trained PB-SMT is low relative to q(x), or because the no overlap constraint was violated causing p(x) to be set to zero.

But this, by itself, is an unsatisfactory solution, because the OS* algorithm may tend to resample this region violating the no overlap rule frequently if p(x) as computed using the trained PB-SMT is high in that region. To avoid this, the refinement performed when p(x)=0 (indicating that the no-overlap condition was violated for the sample x) is constructed to remove the sample (or, more preferably, a region containing the sample) from the WFSA.

Suppose that a sequence $x=a_1 a_2 \ldots a_m$ (where $a_k$ are triples) violates the no overlap constraint. This means that there exists a sub-sequence $a_k \ldots a_{k+l}$ which is such that $a_k$ and $a_{k+l}$ have at least one source language word $f$ in common. The refinement from q to q' then entails locating such a sub-sequence $a_k \ldots a_{k+l}$ in x and modifying q to q' such that the refined automaton q' will not accept any sequence containing the sub-sequence $a_k \ldots a_{k+l}$, but is otherwise equivalent to q. This modification adds on the order of l nodes to the automaton q. Another way of looking at this operation is as the intersection of q with the complement of the language $V^* a_k \ldots a_{k+l} V^*$, where V is the vocabulary of all triples that are relevant to the source sentence being translated.

In general, the sub-sequence $a_k \ldots a_{k+l}$ is not unique. For example, consider the sequence portion . . . $a_{12} a_{13} a_{14} a_{15} a_{16} a_{17}$ . . . where the triples $a_{13}$ and $a_{15}$ both consume the same source word $f$ so as to violate the no overlap rule. In this case, the sub-sequence $a_k \ldots a_{k+l}$ could be chosen as any of the following sub-sequences: $a_{12} a_{13} a_{14} a_{15} a_{16} a_{17}$ or $a_{12} a_{13} a_{14} a_{15} a_{16}$ or $a_{12} a_{13} a_{14} a_{15}$ or $a_{13} a_{14} a_{15} a_{16} a_{17}$ or $a_{13} a_{14} a_{15} a_{16}$ or $a_{13} a_{14} a_{15}$. Of these choices, the minimal length sub-sequence, in this case $a_{13} a_{14} a_{15}$, is generally the preferable choice because refining the automaton to remove all sequences containing this minimal length sub-sequence will remove the maximum number of illegal sequences from the automaton, as compared with other, longer sub-sequences.

This operation guarantees that the next iteration of the OS* algorithm will not produce the current x again, and will also not produce any other path containing a sub-sequence $a_k \ldots a_{k+l}$. Adding such refinements increases the order of some n-gram contexts, but the refinements guarantee convergence of the algorithm in terms of finding the exact optimum (in optimization) or in terms of exceeding any pre-set acceptance rate (in sampling). This is due to the fact that, in the limit, the refinement operations are able to produce a proposal automaton q that is arbitrarily close to the PB-SMT model p(t, a|s). In practice, the refinements may stop earlier, with an exact optimum in the case of optimization, and with an exact sampler of good performance. In the case of optimization, this constitutes proof that the optimal solution has been found.

In some cases, refining q to not accept any sequence containing the sub-sequence $a_k \ldots a_{k+l}$ may remove only a few sequences, leading to slow convergence. It is however possible to eliminate more sequences at one fell swoop. Consider a set Z of triples that are such that they all touch the word $f$, and further consider A to be any subset of the vocabulary V of all triples that are relevant to the source sentence being translated. Then it is possible to intersect q with an automaton representing the complement of the language $V^* Z A^* Z V^*$. In particular, we can take $A=\{a_{k+1}, \ldots, a_{k+l-1}\}$ and $Z=\{a_k, a_{k+l}\}$.

This will tend to eliminate more invalid samples x than simply eliminating all samples containing the sub-sequence $a_k \ldots a_{k+l}$, at the cost of producing more states in q'. In the limit where A is equal to V, it can be shown that the resulting q' has around twice the number of states of q, because in effect we need to record on each state whether it is on a path that "has seen" Z or not. However, when A is limited to a smaller subset of V, then the number of new states that have to be introduced can be significantly smaller.

Yet another, complementary approach is to identify in x some other source word $\tilde{f}$ which is not consumed by x; indeed such a word necessarily exists, because the overlap word $f$ is occupying two "slots" and there are exactly as many slots as they are source words (assuming the value of N for the last triple equals the number of words in the source sentence). This condition can be enforced by intersecting q with the language $v^* \tilde{F} v^*$, where $\tilde{F}$ is the language consisting of the union of all triples containing $\tilde{f}$.

Figure 8:
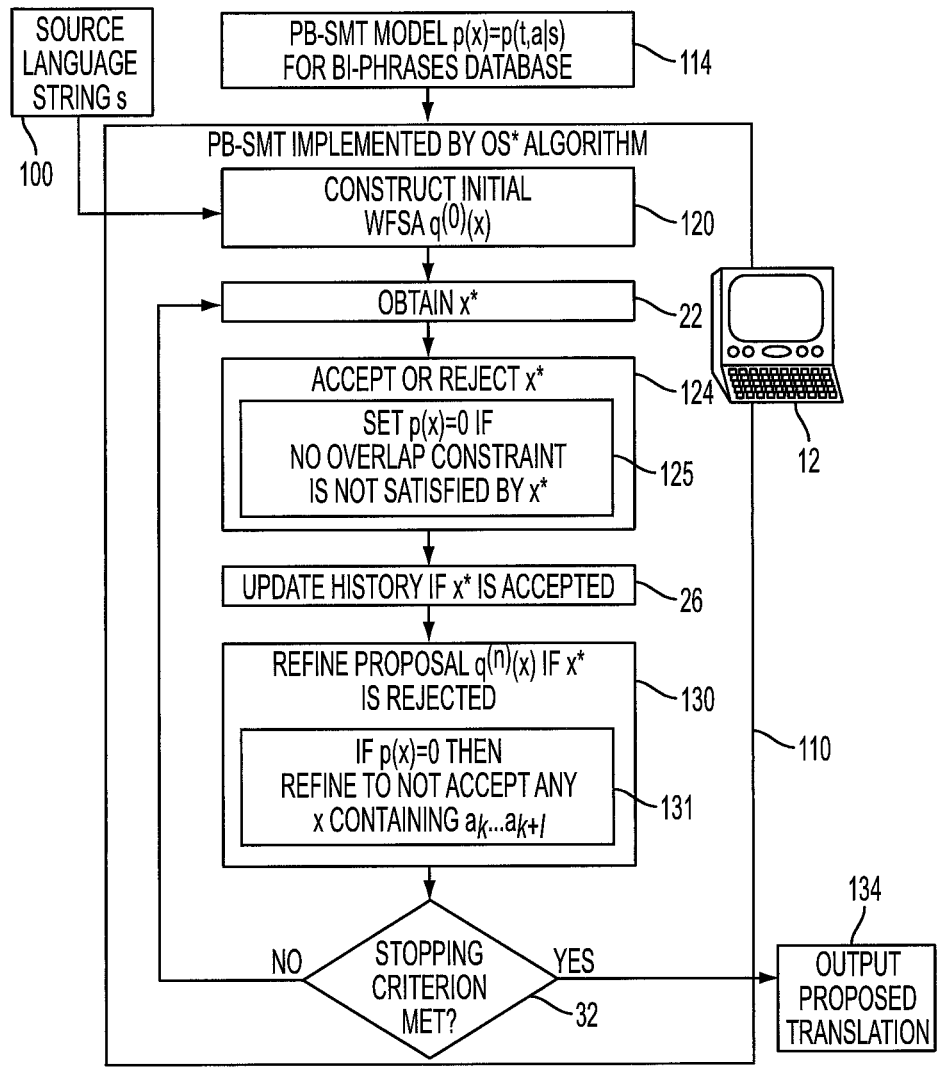
FIG. 8 diagrammatically shows a PB-SMT system using the OS* algorithm of FIG. 1.

With reference to FIG. 8, the system of FIG. 1 is illustrated in the context of the illustrative PB-SMT application applied to translate a source language string s 100, that is, with the OS* algorithm 10 configured to implement a PB-SMT algorithm 110 employing the OS* algorithm. The function or distribution p(x) 14 to be sampled or optimized is here the PB-SMT model p(t, a|s) 114, with the configurations x being over all alignments a that produce candidate translations for s 100. The configurations x are suitably represented using the triple notation (E, B, N) defined herein. The initial proposal distribution) $q^{(0)}(x)$ 20 is constructed as an initial weighted finite state automaton (WFSA) $q^{(0)}(x)$ 120 representing the possible target language translations of s 100 that can be generated using the PB-SMT model p(t, a|s) 114. The automaton q suitably employs edges corresponding to triple elements (E, B, N) (see illustrative example in FIGS. 6 and 7). More particularly, the initial automaton) $q^{(0)}$ satisfies the condition $q^{(0)}(x) \geq p(x)$ for all x representing possible translations for the source language string s 100 according to PB-SMT model p(t, a|s) 114.

The OS* algorithm for the PB-SMT application then performs the sampling operation 22 as described with reference to FIG. 1 to obtain a sample x*. The accept/reject operation 24 is modified to accept/reject operation 124 by including an additional operation 125 of setting p(x*)=0 if the no overlap constraint is not satisfied by sample x*. The response 26 is performed as already described with reference to FIG. 1. The refinement operation 30, which is performed if x* is rejected, is modified to refinement operation 130 by including an additional operation 131 in which it is checked whether p(x*)=0 and, if so, the refinement entails modifying the proposal automaton q to not accept any future sample containing the sub-sequence $a_k \ldots a_{k+l}$ that violates the no overlap constraint. The iteration stop operation 32 are again as already described with reference to FIG. 1, while the output operation 34 is modified to particularly output the proposed translation 134.

In the illustrative embodiment of FIG. 8, violation of the no overlap constraint is effectively flagged by setting p(x*)=0 in the accept/reject operation since this ensures sample x* will be rejected, and the same p(x*)=0 can then be used as a kind of "flag" in the refinement operation 130 to detect that the rejection was due to violation of the no overlap condition. However, other approaches can be used. As an example of an alternative implementation, an additional flag element can be added that is set to 0 if the no overlap constraint is satisfied and is set to 1 if the no overlap constraint is violated, and then the accept/reject operation suitably rejects x* if the flag is set to 1 and the refinement operation checks the same flag in deciding the refinement.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions executable by an electronic data processing device to perform rejection sampling to acquire at least one accepted target language translation for a source language string s in accordance with a phrase-based statistical translation model $$p(x)=p(t,a|s)$$

where t is a candidate translation, a is a candidate alignment comprising a source language-target language biphrase sequence generating the candidate translation t, and x is a sequence representing the candidate alignment a, the rejection sampling using a proposal distribution comprising a weighted finite state automaton (WFSA) $q^{(n)}$ that is refined responsive to rejection of a sample $x^*$ obtained in a current iteration of the rejection sampling to generate a refined WFSA $q^{(n+1)}$ for use in a next iteration of the rejection sampling wherein the refined WFSA $q^{(n+1)}$ is selected to satisfy the criteria:

$$p(x) \leq q^{(n+1)}(x) \leq q^{(n)}(x) \text{ for all } x \in X; \text{ and}$$

$$q^{(n+1)}(x^*) < q^{(n)}(x^*);$$

where the space X is the set of sequences x corresponding to candidate alignments a that generate candidate translations t for the source language string s.

2. The non-transitory storage medium of claim 1, wherein:
the sample $x^*$ is rejected if it does not satisfy a no overlap constraint requiring that the alignment a represented by the sample $x^*$ consumes each word of the source language string s exactly once, and
the refinement performed when the no overlap constraint is not satisfied comprises (i) identifying a sub-sequence $a_k \ldots a_{k+l}$ of the sample $x^*$ that violates the no overlap constraint and (ii) refining WFSA $q^{(n)}$ to WFSA $q^{(n+1)}$ such that WFSA $q^{(n+1)}$ does not accept any sequence x that contains the sub-sequence $a_k \ldots a_{k+l}$.

3. The non-transitory storage medium of claim 2, wherein:
the rejection sampling sets $p(x^*)=0$ if the sample $x^*$ does not satisfy the no overlap constraint, and
the refinement comprising operations (i) and (ii) is performed responsive to the condition $p(x^*)=0$.

4. The non-transitory storage medium of claim 1, wherein the sequence x represents the alignment a as a sequence of triples each including: a field E denoting exactly one word of the translation t, a field B denoting the biphrase generating E, and a field N denoting the count of words of the source language string s consumed by the biphrases of the alignment a up to and including the biphrase generating E.

5. The non-transitory storage medium of claim 4, wherein:
the sample $x^*$ is rejected if it does not satisfy a no overlap constraint requiring that the alignment a represented by the sample $x^*$ consumes each word of the source language string s exactly once as determined based in part on whether the value of N for the last triple of the sample $x^*$ equals the number of words in s.

6. The non-transitory storage medium of claim 1, wherein:
the rejection sampling obtains the sample $x^*$ by random sampling of the space X;
the rejection sampling accepts or rejects $x^*$ based on comparison of a ratio $p(x^*)/q(x^*)$ with a random draw; and
the refined proposal distribution $q^{(n+1)}$ is selected to satisfy the criteria:

$$p(x) \leq q^{(n+1)}(x) \leq q^{(n)}(x) \text{ for all } x \in X;$$

$$q^{(n+1)}(x^*) < q^{(n)}(x^*); \text{ and}$$

a norm $\|q^{(n+1)}\|_\alpha$ is minimized where $\alpha < \infty$.

7. The non-transitory storage medium of claim 6, wherein the rejection sampling acquires a plurality of accepted samples and terminates when a cumulative acceptance rate of the rejection sampling exceeds a threshold.

8. The non-transitory storage medium of claim 6, where $\alpha=1$.

9. The non-transitory storage medium of claim 1, wherein:
the rejection sampling obtains the sample $x^*$ such that $q^*=q^{(n)}(x^*)$ maximizes $q^{(n)}$ over the space X;
the rejection sampling accepts or rejects $x^*$ based on a difference between or ratio of $q^*$ and $p(x^*)$; and
the refined proposal distribution $q^{(n+1)}$ is selected to satisfy the criteria:

$$p(x) \leq q^{(n+1)}(x) \leq q^{(n)}(x) \text{ for all } x \in X;$$

$$q^{(n+1)}(x^*) < q^{(n)}(x^*); \text{ and}$$

a norm $\|q^{(n+1)}\|_\infty = \max\{q^{(n+1)}(x)\}$ is minimized.

10. The non-transitory storage medium of claim 1, wherein the non-transitory storage medium stores instructions executable by an electronic data processing device to perform sampling of the phrase-based statistical translation model p(t, a|s) by accumulating a set of accepted samples $x^*$ over a plurality of iterations of the rejection sampling.

11. The non-transitory storage medium of claim 10, wherein each iteration obtains the sample $x^*$ by random sampling of the space X and accepts or rejects $x^*$ based on comparison of a ratio $p(x^*)/q(x^*)$ with a random draw.

12. The non-transitory storage medium of claim 10, wherein the rejection sampling terminates when a cumulative acceptance rate of the rejection sampling exceeds a threshold.

13. An apparatus comprising:
a non-transitory storage medium as set forth in claim 1; and
an electronic data processing device configured to execute instructions stored on the non-transitory storage medium.

14. A method of generating at least one target language translation for a source language string s in accordance with a phrase-based statistical translation model $p(x)=p(t, a|s)$ where t is a candidate translation, a is a candidate alignment comprising a source language-target language biphrase sequence generating the candidate translation t, and x is a sequence representing the candidate alignment a, the method comprising:
performing iterative rejection sampling of p(x) by generating a sample $x^*$ and accepting or rejecting the sample $x^*$ based on a comparison of $p(x^*)$ and $q(x^*)$ where q is a proposal distribution comprising a weighted finite state automaton, the at least one target language translation corresponding to an accepted sample $x^*$;
during the iterative rejection sampling, identifying a sample $x^*$ that includes a sub-sequence $a_k \ldots a_{k+l}$ violating a no overlap constraint requiring that the alignment a consumes each word of the source language string s exactly once; and refining q so that it does not accept any sequence x that contains the sub-sequence $a_k \ldots a_{k+l}$, the refined q being used in subsequent iterations of the iterative rejection sampling;

wherein the iterative rejection sampling including the identifying and refining operations is performed by an electronic data processing device.

15. The method of claim 14, further comprising setting $p(x^*)=0$ responsive to identifying a sample $x^*$ that includes a sub-sequence $a_k \ldots a_{k+l}$ violating the no overlap constraint, the refining being performed responsive to rejection of a sample $x^*$ for which $p(x^*)=0$.

16. The method of claim 14, wherein x represents the alignment a as a sequence of triples including: a field E denoting exactly one word of the translation t, a field B denoting the biphrase generating E, and a field N denoting the count of words of the source language string s consumed by the biphrases of the alignment a up to and including the biphrase generating E, and the identifying includes:

identifying a sample $x^*$ as including a sub-sequence $a_k \ldots a_{k+l}$ violating the no overlap constraint based on the value of N for the last triple in the sample $x^*$ being different from the number of words in the source language string s.

17. The method of claim 14, wherein the performing of iterative rejection sampling comprises performing the OS* algorithm.

18. An apparatus comprising:
an electronic data processing device; and
a non-transitory storage medium storing instructions executable by the electronic data processing device to perform a method including:

performing rejection sampling of a phrase-based statistical translation model $p(x)=p(t, a|s)$ where t is a candidate translation, a is a candidate alignment comprising a source language-target language biphrase sequence generating the candidate translation t, and x represents the candidate alignment a as a sequence of triples each including: a field E denoting exactly one word of the translation t, a field B denoting the biphrase generating E, and a field N denoting the count of words of the source language string s consumed by the biphrases of the alignment a up to and including the biphrase generating E; and during the rejection sampling, identifying a sample $x^*$ as including a sub-sequence $a_k \ldots a_{k+l}$ violating a no overlap constraint requiring that the alignment a consumes each word of the source language string s exactly once based on the value of N for the last triple in the sample $x^*$ being different from the number of words in the source language string s.

19. The apparatus of claim 18, wherein the method further includes, responsive to identifying a sample $x^*$ that includes a sub-sequence $a_k \ldots a_{k+l}$ violating the no overlap constraint:

refining a proposal distribution used in the rejection sampling such that the proposal distribution no longer includes sequences x containing the sub-sequence $a_k \ldots a_{k+l}$.

20. The apparatus of claim 18, wherein the method further includes, responsive to identifying a sample $x^*$ that includes a sub-sequence $a_k \ldots a_{k+l}$ violating the no overlap constraint:

refining a proposal distribution comprising a weighted finite state automaton q used in the rejection sampling such that q no longer accepts any sequence x that contains the sub-sequence $a_k \ldots a_{k+l}$.

\* \* \* \* \*